United States Patent [19]

Kawasaki

[11] 4,174,154

[45] Nov. 13, 1979

[54] LASER MANIPULATOR APPARATUS WITH DOUBLE PIVOTAL MIRRORS

[75] Inventor: Harumi Kawasaki, Tokyo, Japan

[73] Assignee: Asahi Kogaku Kogyo Kabushiki Kaisha, Tokyo, Japan

[21] Appl. No.: 791,071

[22] Filed: Apr. 26, 1977

[30] Foreign Application Priority Data

Apr. 28, 1976 [JP] Japan .................................. 51-49190

[51] Int. Cl.² .............................................. G02B 5/08
[52] U.S. Cl. .................................. 350/299; 128/303.1; 219/121 L
[58] Field of Search ....................... 350/288, 299, 301; 128/303.1; 219/121 L, 121 LM

[56] References Cited

U.S. PATENT DOCUMENTS

| 3,528,424 | 9/1970 | Ayres | 350/288 UX |
| 3,642,352 | 2/1972 | Beach | 350/288 |

*Primary Examiner*—F. L. Evans
*Attorney, Agent, or Firm*—Sughrue, Rothwell, Mion, Zinn and Macpeak

[57] ABSTRACT

A manual manipulator mechanism for a surgical or industrial laser employs reflecting mirrors 1, 3 each rotatable about two perpendicular axes, to thereby reduce the total number of mirrors required and simplify the overall mechanism. Optical alignment is maintained by a linkage arm and yoke arrangement which is fully rotatable about a first axis, and which causes the controlled mirror to pivot through an angle one-half as much as the laser beam outlet tube 13 pivots about a second axis. The linkage arms may be replaced by a gear or friction wheel mechanism.

6 Claims, 7 Drawing Figures

LASER MANIPULATOR APPARATUS WITH DOUBLE PIVOTAL MIRRORS

BACKGROUND OF THE INVENTION

This invention relates to a multi-axial manipulator for a medical instrument or the like, such as a laser knife, an optical coagulator, a laser machining device, etc.

Carbonic acid gas lasers and argon lasers have recently been employed as medical instruments, and in such use a manipulator is necessary to enable the doctor or user to easily guide the laser beam onto the object to be operated on. In general, such a manipulator comprises a tube or tubes for guiding the laser beam, mirrors for appropriately reflecting the beam, and a condenser lens. In order to move the focused light spot to a desired position in a given cubical space, it is typically necessary to arrange one or more mirrors at each hinge joint of the manipulator, and to rotate each mirror around the in-coming or out-going light axis in order to maintain proper optical alignment. As the conventional manipulator has a large number of pivot arms and reflecting mirrors, its optical path is necessarily quite long and the accurate alignment thereof requires a very precise, complicated, and costly mechanism.

The overall manipulator arrangement or mechanism is similar to that of a belt driven dental drill, where the power or drive source is stationary and the relatively small hand held chuck member is coupled to the source through a plurality of pivot arms. Here, the drive source is the laser generator, and mirrors must be provided at each hinge or pivot joint to keep the laser beam accurately centered within the hollow pivot arms as the user (surgeon) freely manipulates a hand held outward wand or pencil probe.

Recently, a small and powerful carbonic acid gas laser has been developed, whereby the laser generating apparatus has become more portable than before. Thus, if the laser generator is mounted on a portable operating stand whereby its position can be coarsely controlled horizontally and vertically, and if the angle of elevation of the output beam can also be coarsely controlled, it is possible to generally bring the beam to the vicinity of a patient or object to be operated on. A conventional long arm manipulator is unnecessary and unsuitable for such an application, which requires a short arm mechanism which can finely and accurately control the position of the focused laser beam onto a target spot. In addition, a high degree of user and output probe freedom is required of the manipulator, which is not provided by the conventional mechanism.

An example of a conventional or prior art manipulator is schematically shown in FIG. 1, wherein a laser beam S is reflected at the centers $a_1$, $a_2$, $a_3$, $a_4$ and $a_5$ of the mirrors 1, 2, 3, 4 and 5, respectively, and forms a small light spot (about 0.1 mm in diameter) at a focal point T through a condenser lens 30. The X, Y and Z coordinates are oriented as shown in the figure, and the small white circles on the optical axes designate the mirror rotation axes. That is, mirrors 1, 3, 4 and 5 can rotate around the axes $X_1$, $Y_1$, $X_2$ and $Y_2$, respectively. Accordingly, the light spot T can be accurately moved to a desired coordinate in the horizontal plane $X_3Y_3$, which is assumed to represent an object or subject to be operated on, or to a desired coordinate in a given vertical plane such as $X_3Z_3$ and $Y_3Z_3$. A fine control mechanism (not shown) accurately adjusts the reflecting mirrors to form 45° angles with the respective incident light beams and directs the rotation centers of the incident light spots onto the mirror surfaces. It is important that the laser light can be applied, at a desired angle of incidence, to the target surface plane $X_3Y_3$. In most operations the laser light is applied vertically to the object to be operated on. For this reason, the mirror rotations on each of the X- and Y-axes are opposite to each other, that is, the rotation of the mirrors on the $X_1$- and $X_2$- ($Y_1$- and $Y_2$-) axes are opposite to each other.

FIG. 3 shows a conventional mirror rotation mechanism, wherein a laser light beam 6 is perpendicularly reflected by the surface 7 of a mirror 10 to an out-going light beam 8. A bearing 12 is mounted in a mirror holder 9 so that an inlet tube 11 can rotate around an optical axis 6–7. No matter how the mirror holder 9 rotates, it is necessary that the outgoing light beam 8 lie on the center axis of the outlet tube 13, and for this purpose a fine control mechanism (not shown) is required to set the mirror 10 at precisely 45° and to properly position the reflecting point on the mirror surface.

SUMMARY OF THE INVENTION

In the optical manipulator according to this invention a rotation mechanism is provided whereby a single beam reflecting mirror can be simultaneously rotated about an optical input axis and about an axis perpendicular thereto. As a result, the total number of reflecting mirrors required is significantly less than in conventional mechanisms, whereby the overall size and weight of the manipulator can be reduced and the mirror positioning mechanisms can tolerate greater alignment errors, thereby reducing the cost of the apparatus.

DETAILED DESCRIPTION OF THE PREFERRED EMBODIMENTS

Figure 1:
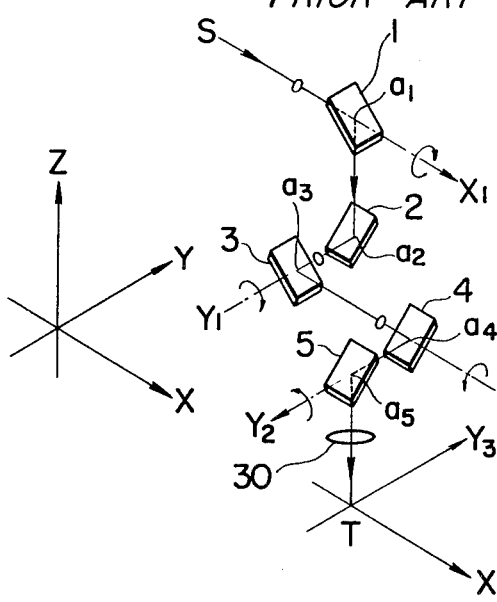
FIG. 1 shows a schematic diagram of a conventional mirror reflecting manipulator.
Figure 2:
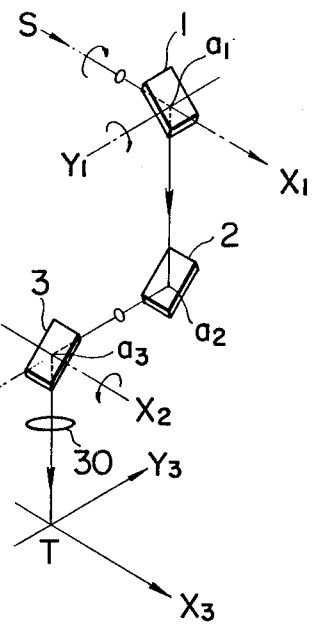
FIG. 2 shows a schematic diagram of such a manipulator according to this invention.

In the manipulator according to this invention, as schematically shown in FIG. 2, mirrors 1 and 3 can simultaneously rotate around the $X_1$- and $Y_1$-axes, and around the $X_2$- and $Y_2$-axes, respectively, while mirror 2 is fixedly mounted. Thus, the light spot T can be moved not only to a desired point in the $X_3Y_3$ plane, but also to a desired point in the $X_3Z_3$ and $Y_3Z_3$ planes, similar to FIG. 1. The merit of this arrangement is that since mirrors 1 and 3 can each rotate around two axes, the number of mirrors required is reduced by two, whereby the length of the laser light path, and hence the manipulator cylinder length, can be considerably shortened. Thus, a simple, small, and light weight manipulator can be obtained. In surgical operation a large degree of freedom, such as when using a pencil device, is undoubtedly required in a manipulator, whereby the reduction of the number of reflecting mirrors is a great advantage. Furthermore, as the number of reflecting surfaces is reduced the number of mirror angle adjustments is also reduced and the tolerance of each angular adjustment becomes less critical, which is a most significant advantage of the dual rotation axis arrangement according to this invention. For example, since the reflecting angle accuracy of the laser beam is twice as high as that of the reflecting mirror, the allowable angular accuracy is related to the number of mirrors by the power of two. Although mirror 2 is shown as being fixedly mounted, if it is made to rotate around the Z-axis the degree of freedom of operation of the manipulator can be further improved.

FIG. 4 shows a dual axis rotation device for a manipulator according to this invention.

Figure 3:
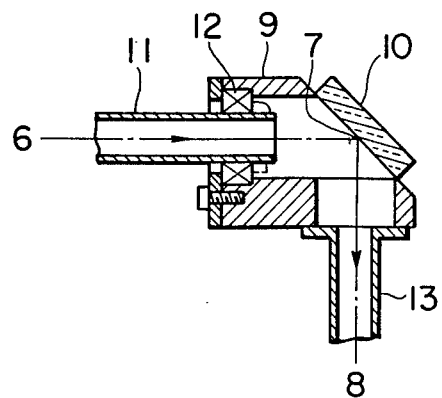
FIG. 3 shows a sectional view of a conventional single axis mirror rotation mechanism.

In FIG. 4, a mirror 10 can rotate around the O axis (perpendicular to the plane of the drawing) and around the A—A' axis perpendicular to the O axis and to the plane including both the incident and out-going light beams. The mirror 10 and its mirror holder 9 are actually set at an angle of 45° with respect to the surface plane of the drawing, although it appears as if they are parallel to the drawing. The mechanism for rotating the mirror 10 around the O axis may be a conventional one such as shown in FIG. 3, and all of the elements designated by reference numerals 9 through 25 in FIG. 4 are rotated by this mechanism.

Figure 4A:
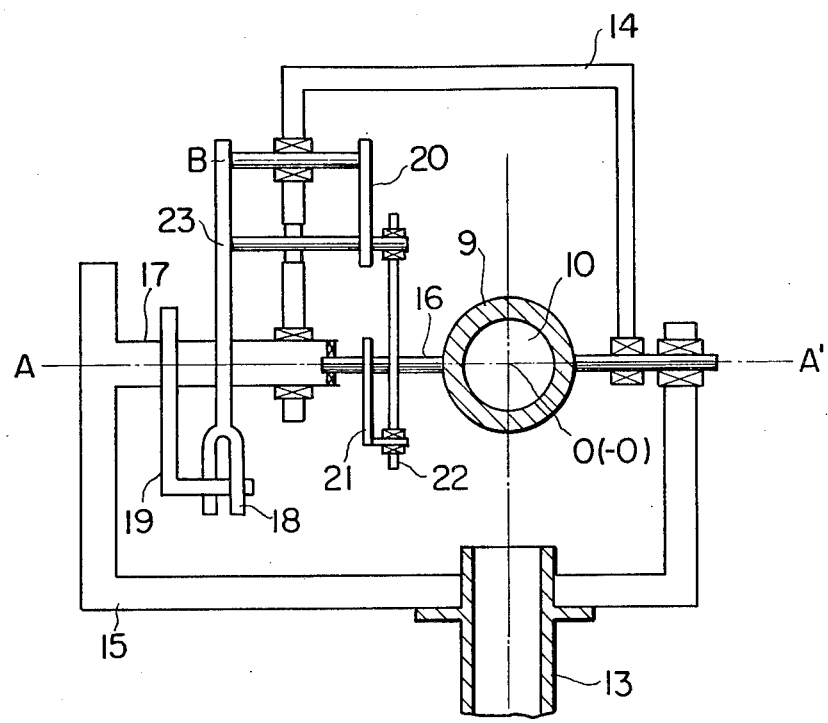
FIGS. 4(a)–(c) show a dual axis mirror rotation mechanism for a manipulator according to this invention.
Figure 4B:
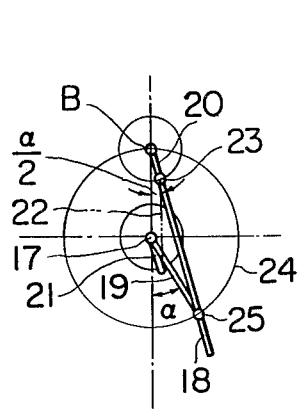
Figure 4C:
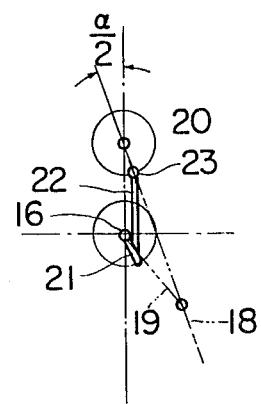
Figure 4D:
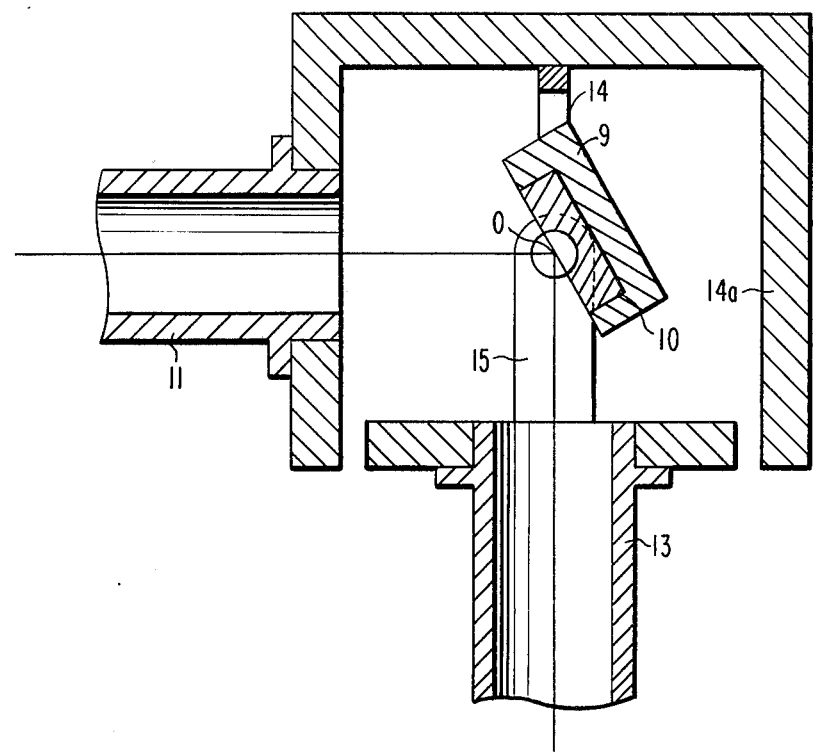
FIG. 4(d) shows a side sectional view of the device according to the present invention.

The mechanism for effecting rotation about the second axis A—A' will now be described. For such rotation, the mirror 10 must rotate exactly one-half as much as the outlet tube 13 in order to maintain the optical alignment of the laser outlet beam 8 within the tube 13. That is, if the outlet tube is rotated about axis A—A' by an angle α, the mirror must be rotated by an angle of α/2. In this mechanism the outlet tube is rotated by the linkage arrangement shown in FIG. 4(b), and the mirror holder 9 is rotated by the linkage arrangement shown in FIG. 4(c). As best shown in FIG. 4(a), the mirror holder 9 is secured to an internal shaft 16 mutually slidably (rotatably) coupled to an external shaft 17 through an inner yoke 14 and bearing means therebetween. The rotatable joints are shown by the bearing illustrations in FIG. 4(a). The outlet tube 13 is fixedly mounted on an outer yoke 15 coaxially with the center O of the reflecting mirror, and can thus rotate around the A—A' axis. The mechanism for enabling rotation about the O axis, while not specifically shown, could, for example, comprise a further yoke member mounted for rotation about the A—A' axis and disposed outside of the yoke 15, and an inlet tube 11 rotatably coupled to such further yoke member in the manner shown in FIG. 3. The further yoke member 14a in FIG. 4(d) is rigidly coupled to the inner yoke 14, so that the pivot axis B (described below) remains fixed or stationary relative to the further yoke member and inlet tube 11. The rotation link mechanism is shown in FIG. 4(b), wherein a radius arm 19 having a predetermined length is coupled to an arm 18 at a slide joint 25, and is fixedly secured to shaft 17 for rotation about the axis A—A' along circumference 24. The arm 18 can rotate around an axis B located on the circumference 24. Thus, from a geometrical standpoint, when the arm 19 rotates through an angle α the rotation angle of the arm 18 is exactly α/2. FIG. 4(c) shows the rotation link mechanism for the mirror holder 9. This is a parallel link mechanism for transmitting the rotation angle α/2 about the axis B to the A—A' axis as represented by the internal shaft 16, and comprises arms 20, 21 and 22, wherein arms 20 and 21 have the same operative length and arm 22 is equal in length to radius arm 19. This parallel link mechanism is connected to the arm 18 at a joint 23 by a coupling arm that extends through a slot in the inner yoke 14. With such an arrangement the rotation of the outlet tube 13 about the A—A' axis causes the mirror holder 9 to rotate in a half-angle relationship.

It is to be understood that the linkage arrangement shown in FIG. 4 is in schematic rather than actual form. For example, in actual practice the arms 18 and 22 would be bowed or curved near their center portions to permit rotation through wider angles, i.e. to prevent their striking against shafts 17, 16, respectively. Also, if arms 18 and 20 are made integral and sufficiently rigid, the coupling arm at joint 23 can be eliminated.

The dual axis mirror rotation concept described above is not limited to implementation by the disclosed linkage arm mechanism, but may be equally realized by a gear system, a friction wheel mechanism, or the like. Similarly, the manipulator mechanism is not limited to surgical laser knives, but is also applicable to precision machining devices such as wood carvers, material cutters, and welding machines.

What is claimed is:

1. In a manual optical manipulator mechanism including a laser beam source, a freely movable output member having a condenser lens therein for concentrating the laser beam, a plurality of hollow tubular members pivotally coupled between the source and the output member, and a plurality of reflecting mirrors disposed at the pivotal couplings to define a continuous optical beam path within the tubular members, the improvement characterized by:

means mounting at least one of said mirrors for rotation about two mutually perpendicular axes, one of said axes being coincident with the incoming laser beam and the other axis being perpendicular to the plane including and defined by the incoming and outgoing laser beams and lying in the plane of the mirror surface, said mounting means controlling the rotation of the mirror such that it rotates about said other axis through an angle equal to one-half of the angular rotation of the outgoing laser beam about said other axis.

2. An optical mechanism as defined in claim 1, wherein said mounting means comprises;
(a) a first yoke member pivotally mounted for rotation about said other axis,
(b) a laser beam inlet tube rotatably mounted to the first yoke member and concentrically disposed about the incoming laser beam,
(c) a second yoke member pivotally mounted for rotation about said other axis and disposed inwardly of the first yoke member,
(d) a laser beam outlet tube mounted to the second yoke member and concentrically disposed about the outgoing laser beam,
(e) a third yoke member pivotally mounted for rotation about said other axis and disposed inwardly of the second yoke member,
(f) mirror frame means mounted for rotation about said other axis and disposed inwardly of the third yoke member,
(g) means rigidly interconnecting the first and third yoke members, and
(h) coupling means interconnecting the second and third yoke members and the mirror frame means such that the mirror frame means rotates one-half the angular amount of the second yoke means about said other axis.

3. An optical mechanism as defined in claim 2, wherein said coupling means comprises a plurality of fixedly, pivotally and slidably connected linkage arms.

4. An optical mechanism as defined in claim 1, comprising two mounting means for individually controlling the rotation of two of said mirrors.

5. An optical mechanism as defined in claim 2, comprising two mounting means for individually controlling the rotation of two of said mirrors.

6. An optical mechanism as defined in claim 3, comprising two mounting means for individually controlling the rotation of two of said mirrors.

* * * * *